US012663527B1

(12) United States Patent
Olvera et al.

(10) Patent No.: US 12,663,527 B1
(45) Date of Patent: Jun. 23, 2026

(54) MOVEABLE SENSOR SYSTEMS AND METHODS FOR COLLECTING DATA UNDERWATER FOR A MARINE VESSEL

(71) Applicant: Brunswick Corporation, Mettawa, IL (US)

(72) Inventors: Paul E. Olvera, Edgewater, FL (US); Matthew Morelly, New Smyrna beach, FL (US)

(73) Assignee: Brunswick Corporation, Mettawa, IL (US)

( * ) Notice: Subject to any disclaimer, the term of this patent is extended or adjusted under 35 U.S.C. 154(b) by 144 days.

(21) Appl. No.: 18/806,381

(22) Filed: Aug. 15, 2024

(51) Int. Cl.
*G01S 7/521* (2006.01)
*G10K 11/00* (2006.01)

(52) U.S. Cl.
CPC ............ *G01S 7/521* (2013.01); *G10K 11/006* (2013.01)

(58) Field of Classification Search
CPC ....... G10K 11/006; G01S 7/521; G01S 15/96; G01S 15/42; G01S 15/87; G01S 15/8902; G01S 7/6281
See application file for complete search history.

(56) References Cited

U.S. PATENT DOCUMENTS

| | | | | | |
|---|---|---|---|---|---|
| 5,069,642 | A | * | 12/1991 | Henderson | ........... B63H 20/007 |
| | | | | | 114/144 R |
| 5,171,173 | A | * | 12/1992 | Henderson | ........... B63H 20/007 |
| | | | | | 440/7 |
| 5,525,081 | A | * | 6/1996 | Mardesich | ........... B63H 20/007 |
| | | | | | 440/6 |
| 6,652,331 | B2 | * | 11/2003 | Healey | .................... G01S 7/521 |
| | | | | | 367/173 |
| 6,667,934 | B1 | | 12/2003 | Healey | |
| 7,150,664 | B1 | * | 12/2006 | Uppgard | ................ B63H 20/12 |
| | | | | | 440/61 C |
| 7,255,616 | B1 | | 8/2007 | Caldwell | |
| 7,467,595 | B1 | | 12/2008 | Lanyi | |
| 7,941,253 | B1 | | 5/2011 | Brant | |
| 9,966,895 | B1 | * | 5/2018 | Deuel | ..................... H02P 11/04 |
| 10,137,971 | B2 | | 11/2018 | Andrasko | |
| 10,800,502 | B1 | | 10/2020 | Alby | |
| 2002/0013106 | A1 | * | 1/2002 | Healey | .................... G01S 7/521 |
| | | | | | 440/6 |

(Continued)

OTHER PUBLICATIONS

"BTR 185 Retractable Bow Thruster" accessed from https://www.quickusastore.com/boat-supply/thrusters/retractable-bow-thrusters/btr-retractable-bow-thruster/ accessed from Jul. 15, 2024.

(Continued)

*Primary Examiner* — Abdallah Abulaban
*Assistant Examiner* — Amie M Ndure
(74) *Attorney, Agent, or Firm* — Andrus Intellectual Property Law, LLP

(57) ABSTRACT

A moveable sensor system for a marine vessel. A support member is configured to be coupled to the marine vessel, wherein the support member is configured to at least one of support a marine drive for propelling the marine vessel and to anchor the marine vessel. A sensor is moveably coupled to the support system so as to be positioned for collecting data within a region underwater. An actuator is coupled between the support member and the sensor, wherein the actuator is operable to move the sensor relative to the support member to thereby change the region in which the data is collected.

20 Claims, 9 Drawing Sheets

(56) References Cited

U.S. PATENT DOCUMENTS

| | | | | |
|---|---|---|---|---|
| 2002/0044500 A1* | 4/2002 | Hansen | .................. | G01S 15/88 |
| | | | | 367/173 |
| 2003/0203684 A1* | 10/2003 | Healey | .................. | G01S 15/86 |
| | | | | 440/6 |
| 2016/0325814 A1* | 11/2016 | Antao | .................... | G01S 15/96 |
| 2019/0064348 A1* | 2/2019 | Clark | .................... | G01S 15/96 |
| 2023/0393251 A1* | 12/2023 | Hesse | .................... | G01S 7/521 |

OTHER PUBLICATIONS

"Imtra Learning Center" accessed from https://www.imtra.com/learning-center/articleid/45/choose-right-thruster-for-your-boat on Jul. 15, 2024.
"Dual Anchors, Onepump" accessed from https://power-pole.com/one-pump on Jul. 15, 2024.

* cited by examiner

MOVEABLE SENSOR SYSTEMS AND METHODS FOR COLLECTING DATA UNDERWATER FOR A MARINE VESSEL

FIELD

The present disclosure generally relates to marine vessels, and particularly to systems and methods for collecting data underwater for marine vessels.

BACKGROUND

The following are incorporated by reference in entirety.

U.S. Pat. Nos. 9,966,895; 6,667,934; 6,652,331; and 5,525,081 generally relate to trolling motors having motors for propelling a marine vessel, as well as having integrated sonar transducers.

U.S. Pat. No. 5,171,173 discloses a servo controlled trolling motor steering system that provides improved speed and steering control.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a moveable sensor system for a marine vessel. A support member is configured to be coupled to the marine vessel, wherein the support member is configured to at least one of support a marine drive for propelling the marine vessel and to anchor the marine vessel. A sensor is moveably coupled to the support system so as to be positioned for collecting data within a region underwater. An actuator is coupled between the support member and the sensor, wherein the actuator is operable to move the sensor relative to the support member to thereby change the region in which the data is collected.

In certain examples, the support member is configured to be moveable relative to the marine vessel to selectively anchor the marine vessel therewith.

In certain examples, the support member extends along an axis, and wherein the actuator is operable to move the sensor about the axis.

In certain examples, the region comprises a depth underwater, and wherein the actuator is operable to move the sensor to change the depth in which the data is collected by the sensor.

In certain examples, the actuator comprises an electric motor operable to move the sensor. In further examples, the support member extends along an axis, and wherein the electric motor comprises a motor shaft that is rotated during operation, the motor shaft extending along a motor shaft axis that is parallel to axis of the support member. In further examples, a conductor for providing power to the electric motor extends through at least a portion of the support member so as to be protected therein. In further examples, a controller is configured to control the electric motor in response to a user input.

In certain examples, wherein the sensor comprises a sonar sensor.

In certain examples, wherein the marine vessel further comprises a marine drive coupled to the supporting member and operable to generate propulsion for the marine vessel. In further examples, the actuator moves the sensor relative to the marine drive. In further examples, the marine drive is steerable independently of the actuator moving the sensor.

Certain examples further include links through which the support member is coupled to the marine vessel as a four-bar linkage.

In certain examples, the support member is moveable relative to the marine vessel between a at least one deployed position in which the sensor is positioned underwater and a stowed position in which the sensor is out of the water.

In certain examples, the actuator comprises a cable through which tension is adjustable to move the sensor relative to the support member.

In certain examples, the support member is a first support member, the sensor is a first sensor configured to collect the data from a first region, and the actuator is a first actuator, and the moveable sensor system further includes a second support member configured to be coupled to the marine vessel, a second sensor moveably coupled to the support system so as to be positioned for collecting data within a second region underwater, and a second actuator coupled between the second support member and the second sensor, wherein the second actuator is operable to move the second sensor relative to the second support member to thereby change the second region in which the data is collected, wherein the second region is different than the first region. In further examples the first actuator and the second actuator comprise electric motors operable to move the first sensor and the second sensor, respectively. In further examples a controller is configured to control the electric motors together in response to a user input.

Another aspect according to the present disclosure generally relates to a method for collecting data underwater for a marine vessel. The method includes moving a support member coupled to the marine vessel from a stowed position to a deployed position, wherein when the support member is in the deployed position a sensor coupled thereto is positioned deeper underwater than when in the stowed position. The method further includes moving the sensor relative to the support member while the sensor is positioned underwater, and collecting data via the sensor while the sensor is positioned underwater.

In certain examples, the method further includes moving the sensor relative to the support member by controlling an electric motor coupled therebetween.

It should be recognized that the different aspects described throughout this disclosure may be combined in different manners, including those than expressly disclosed in the provided examples, while still constituting an invention accord to the present disclosure. Various other features, objects and advantages of the disclosure will be made apparent from the following description taken together with the drawings.

BRIEF DESCRIPTION OF THE DRAWINGS

Examples are described with reference to the following drawing figures. The same numbers are used throughout to reference like features and components

DETAILED DESCRIPTION

Figure 1:
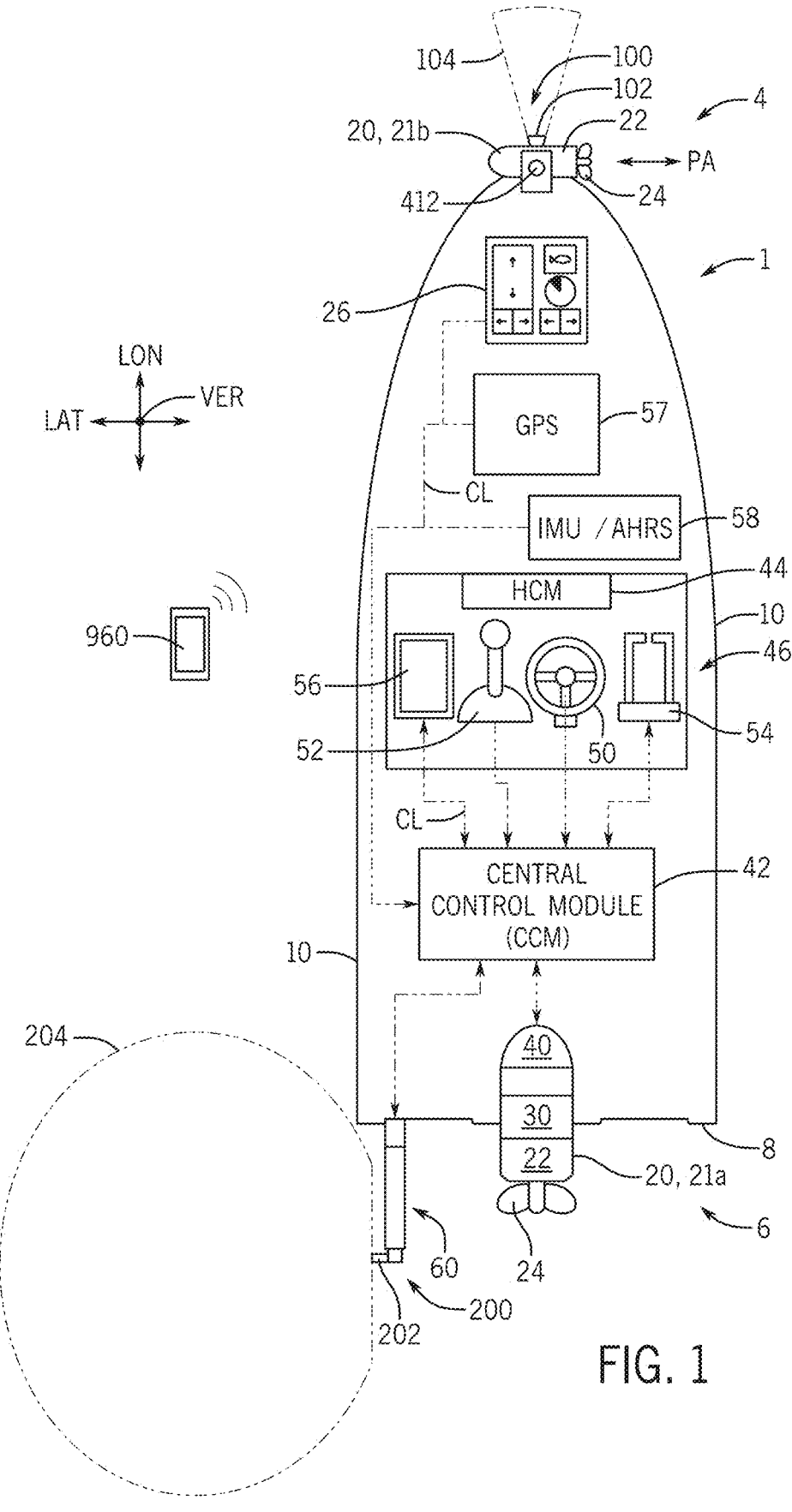
FIG. 1 is a schematic view of a marine vessel incorporating two embodiments of moveable sensor systems according to the present disclosure.

The present inventors have recognized challenges with sonar systems presently known in the art for marine vessels. A marine vessel having a sonar system for collecting data underwater often also has a marine drive to propelling the marine vessel in the water, such as a trolling motor. In one group of system, the sonar system is fixed to the marine vessel (e.g., screwed into the hull) and thus can only collect data within one region. In other words, the sonar system only collects data for a region forwardly from the sonar system (e.g., under the marine vessel and/or some distance ahead of the marine vessel). The present inventors have recognized that this capability is very limiting, not allowing the user to see other obstacles or objects of interest within any other regions relative to the boat (e.g., a fisherperson wishing to cast rearwardly from the transom of the marine vessel cannot see whether fish or underwater obstacles are present). In this case, the user would need to reposition the marine vessel to see a different region underwater, which may require pulling up anchors and taking a substantial time to make the change. This change may also not be possible or preferred given the direction of the current, waves, and/or the like, for example if the user has chosen to orient the bow of the marine vessel towards the waves to minimize rocking and water coming over the deck.

Another group of systems provides for a sonar system that is still separate from the marine drive, but not fixed in place. For example, the sonar system may be coupled to the deck of the marine vessel and deployable into the water for use. In this case, both the sonar system and the marine drive take up space on the deck or elsewhere where coupled to the marine vessel. This creates for obstacles for the user to avoid when moving about the marine vessel and also limits the available space for coupling other items, for example shallow water anchoring systems such as a Power-Pole® produced by JL Marine Systems Inc. of Tampa, FL. These shallow water anchoring systems are deployable to selectively stick into the ground to anchor or retain the position of the marine vessel, rather than dropping a traditional anchor on a line or chain. The requirement for twice the space (i.e., space for coupling a sonar system and space for coupling a marine drive such as a trolling motor) is also prohibitive for some marine vessels that simply do not have the room.

Yet another group of systems seeks to solve this space issue by integrating the sonar system within the marine drive, as described in U.S. Pat. Nos. 9,966,895; 6,667,934; 6,652,331; and 5,525,081. While these configurations can reduce the footprint over separate sonar and marine drive systems, and the sonar system may be steerable by steering the marine drive, the present inventors have recognized that such systems still have undesirable limitations. In particular, there are circumstances in which the user wishes to see in one direction underwater, but to operate the marine drive in another direction. In some cases, the direction in which the marine vessel is traveling does not even coincide with the direction of the marine drive, for example when a trolling motor is steered to counter the effects of a cross current. The present inventors have further recognized that, marine vessels may be propelled at very low speeds while the fisherperson fishes, for example driving the marine drive dead ahead via a foot pedal but casting in any number of directions about the marine vessel. Likewise, the marine vessel may be configured to propel the marine vessel on an auto-pilot mode (e.g., the SmartCraft® control system produced by Mercury Marine of Fond du Lac, WI), or in a station keeping mode (e.g., the Skyhook® digital anchoring system produced by Mercury Marine of Fond du Lac, WI), freeing the user up to cast from any side of the boat, but without allowing the user to see underwater in any direction other than that of the travel.

In view of these limitations, the present inventors have developed new systems and methods for providing a moveable sonar systems without increasing the space requirements, installation time, wiring, controllers, and the like over other systems within the marine vessel, whether a marine drive such as a trolling motor, one or more shallow water anchoring systems, and/or other devices.

While the present disclosure primarily describes moveable sensor systems that include sonar sensors, it should be recognized that use with other types of sensors is also contemplated, including radar, LIDAR, laser, ultrasonic, infrared, cameras, salinity, temperature, pH, or others.

FIG. 1 depicts a marine vessel 1 having a hull 2 that extends in a longitudinal direction LON between a bow 4 and a stern 6 with a transom 8 located at the stern 6. The hull 2 further extends between sides 10 in a lateral direction LAT that is perpendicular to the longitudinal direction LON. The sides 10 of the hull 2 each extend between a top and a bottom in a vertical direction VER that is perpendicular to both the longitudinal direction LON and perpendicular to the lateral direction LAT.

The marine vessel 1 includes two marine drives 20 configured to generate thrust to propel the marine vessel 1 through water in a conventional manner. In the embodiment shown, the marine drives 20 include a first marine drive 21a positioned at the transom 8 of the marine vessel 1 and a second marine drive 21b positioned at the bow 4. The first marine drive 21a is shown as a conventional outboard motor, but could alternatively be an inboard motor, a stern drive, a pod drive, an outboard motors having steerable gearcases (such as disclosed in U.S. Pat. No. 10,800,502, which is incorporated herein in its entirety), a jet drive, and/or any other devices configured to propel a marine vessel 1. The second marine drive 21a is shown as a deployable trolling motor, which is provided in conjunction with a moveable sensor system 100 having a sensor 102 configured for collecting data within region 104 underwater according to the present disclosure, as discussed further below.

Each of the marine drives 20 has a powerhead 22 (e.g. an electric motor, an internal combustion engine, or a hybrid thereof) coupled in a torque-transmitting relationship with a propellor 24 to propel the marine vessel 1 in a manner known in the art. One or both of the powerheads 22 may be operated via a "drive-by-wire" control system such as described in U.S. Pat. No. 7,941,253, which is incorporated by reference herein in its entirety, and/or via other mechanisms for adjusting throttle, such as a throttle grip. For the second marine drive 21b, the drive-by-wire control system may be controlled via inputs from a pedal 26 in a conventional manner. However, other aspects of the pedal 26 are unconventional, as discussed below. With additional reference to the exemplary control system 900 of FIG. 10, each marine drive 20 further includes a powerhead speed sensor 30 (e.g. a Hall-effect sensor) that measures the rotational speed of the powerhead 22 in rotations per minute (RPM) in a manner known in the art.

The marine drives 20 are steerable via steering actuators 962 (see FIG. 10) as a "steer-by-wire" system in a manner known in the art, for example via electric motors, hydraulic actuators, and/or pneumatic actuators (see U.S. Pat. Nos. 7,150,664; 7,255,616; 7,467,595; and 8,113,892, which are incorporated by reference herein in their entireties). The trim angle of each of the marine drives 20 may also adjustable in a manner known in the art, specifically by control of trim actuators 964 (see FIG. 10) (which may also be mechanical, electric, electromechanical, hydraulic, and/or pneumatic as described in U.S. Pat. No. 10,137,971, which is incorporated by reference herein in its entirety). Each marine drive 20 also includes a propulsion control module 40 (PCM 40) that receives signals for operating the marine drive 20 in a manner known in the art, including the powerhead 22, the steering actuators, and/or the trim actuators.

With continued reference to FIG. 1, the PCMs 40 each communicate with a central control module 42 (CCM 42), with the central control module 42 also communicating with a helm control module 44 (HCM 44) at a helm 46 of the marine vessel 1 in a conventional manner. Additional information regarding these elements, which together form a control system 900, is provided below.

The helm 46 includes a number of operator input devices through which an operator can input commands for controlling the marine vessel 1. These commands are received by the HCM 44 and communicated to the CCM 42 for controlling the PCMs 40 in the marine drives 20. The helm 46 of FIG. 1 includes steering devices, here a steering wheel 50 and joystick 52, which inputs steering commands for operating the steering actuators 962 (See FIG. 10) to steer the marine vessel 1 in a manner known in the art. Steering commands may also be received from the control system 900 when operating autopilot, station keeping, or other automated control modes known in the art A throttle lever 54 is operable for providing thrust commands for the powerheads 22, including both a magnitude and a direction of thrust. These thrust commands may also be received from the joystick 52 and/or the control system 900 for autopilot, station keeping, or other automated control modes known in the art.

The helm 46 further includes trim controls (e.g. rocker switches or touchscreen controls) for adjusting the trim angles of the marine drives 20 via the trim actuators 964 (see FIG. 10) in a manner known in the art. The helm also includes a multi-functional display device 56 including a user interface, which may be an interactive, touch-capable display screen, a keypad, a display screen and keypad combination, a track ball and display screen combination, and/or any other type of user interface known in the art.

With continued reference to FIG. 1, the marine vessel 1 also includes a shallow water anchoring system, or simply an anchoring system 60 deployable to stick into the ground to anchor the marine vessel 1 in a conventional manner. The anchoring system 60 is provided in conjunction with another moveable sensor system 200 having a sensor 202 configured for collecting data within region 204 underwater according to the present disclosure, as discussed further below.

Figure 2:
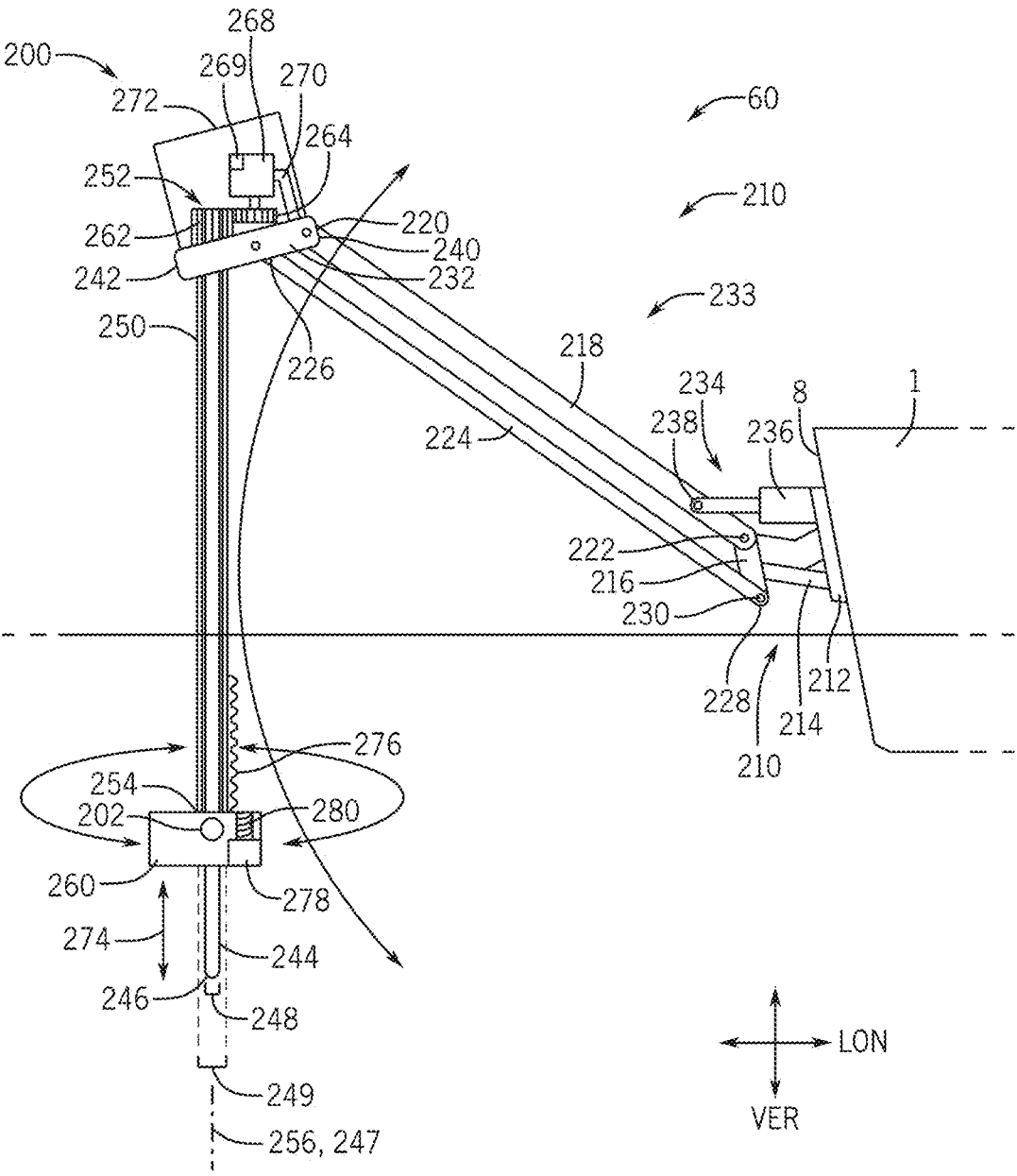
FIG. 2 is a partial starboard side view of the marine vessel of FIG. 1.

With reference to FIG. 2, additional information is now provided regarding the anchoring system 60 and the moveable sensor system incorporated therewith, such as the moveable sensor system 200 of FIG. 1. Other than the incorporation of the moveable sensor system 200, the anchoring system 60 may be configured similarly to those known in the art, such as the Power-Pole®. A bracket 210 is coupled to the marine vessel 1, here at the transom 8 though other locations are also contemplated. The bracket 210 may be coupled to the transom 8 via fasteners (e.g., screws or bolts) extending through a base 212 and into the transom 8 in a conventional manner. An extension member 214 is coupled to the base 212, which extend further aftwardly from the base 212 to provide additional clearance behind the marine vessel 1 for operating the anchoring system 60. A first plate 216 is coupled to the extension bracket 214. The anchoring system 60 further includes an upper arm 218 that extends between a first end 220 and a second end 222, and a lower arm 224 that extends between a first end 226 and a second end 228. The present disclosure contemplates other configurations in which greater or fewer arms are used. The arms may also be referred to as links.

The second ends 222, 228 of the upper arm 218 and the lower arm 224 are pivotally coupled to the first plate 216, such as via fasteners 230 (e.g., bolts, pins, rivets, etc.) or axles. First ends 220, 226 of the upper arm 218 and the lower arm 224 are pivotally coupled to a second plate 232, which may again be via fasteners (e.g., bolts, pins, rivets etc.) or axles. The first plate 216, second plate 232, the upper arm 218, and the lower arm 224 together form a four-bar linkage system 233.

An actuator 234, shown here as a linear actuator (e.g., mechanical, electromechanical, pneumatic, or hydraulic) is coupled at a base end 236 to the base 212 and an opposing rod end 238 is pivotally coupled to the upper arm 218. Operating the actuator 234 causes the upper arm 218 to pivot about a pivot axis 240 where it is coupled to the base 212, here by changing a distance between the base end 236 and the rod end 238 of the actuator 234. By virtue of the four-bar linkage system 233, pivoting the upper arm 218 also causes rotation of the lower arm 224 and thus movement of the second plate 232.

The second plate 232 extends from a first end 240 to a second end 242, whereby the upper arm 218 is pivotally coupled thereto near the first end 240 and the lower arm 224 is pivotally coupled thereto at a position between the first end 240 and the lower arm 224. Also coupled to the second plate 232 is a spike or shaft 244 (also referred to as a support member) that extends from the second plate 232 to an end 246 along an axis 247. The shaft 244 is configured to be driven into the ground via operation of the actuator 234 (through the four-bar system) to thereby anchor the marine vessel 1 in shallow waters. The shaft 244 may be configured similarly to those of conventional anchoring systems, having a substantially cylindrical shape of diameter 248 that tapers towards the end 246. In the configuration shown, extending the actuator 234 causes the shaft 244 to move downwardly, and vice versa. The actuator 234 may be controlled to operator in a conventional manner within the control system 900 (FIG. 10) and is thus not discussed further for the sake of brevity.

The moveable sensor system 200 of FIG. 2 includes a generally hollow and cylindrical sleeve 250 that extends from a first end 252 to a second end 254 and has an inner diameter 249 that is greater than the diameter 248 of the shaft 244 such that shaft 244 may extend therethrough. The sleeve 250 is rotatably coupled to the second plate 232 such that the sleeve 250 is rotatably about a rotation axis 256. In certain embodiments, the sleeve 250 extends entirely through the sleeve 250 and is supported by gears, bearings, and/or bushings to provide axial fixation and smooth rotation.

A sonar system 260 is coupled to the second end 254 of the sleeve 250. The sonar system 200 may be the same or similar to those known in the art, which has a sensor 202 being operable to collect data within a region 204 (see FIG. 1) underwater. The sonar system 260 is coupled to the sleeve 250 such that rotation of the sleeve 250 about its rotation axis 256 causes rotation of the sensor 202 to thereby change the region in which the data is collected underwater. Although in the present embodiment the rotational axis 256 of the sleeve 250 is both parallel and coaxial with the axis 247 of the shaft 244, other contemplated embodiments are only parallel, or are not parallel. Likewise, the shaft of the motor 268 is parallel to the rotational axis 256 of the sleeve 250, though other configurations are contemplated (e.g., using different gears, gearboxes, etc. between the sleeve 250 and the motor 268).

The sleeve 250 may be rotated in a number of ways with FIG. 2 showing a motorized example. In particular, a gear 262 is fixed to the first end 252 of the sleeve 250 above the second plate 232 such that the second plate 232 is positioned axially between the gear 262 and the sonar system 260. The gear 262 may be configured to assist in retaining the axial position of the sleeve 250 relative to the second plate 232 as the weight of the sonar system 260 provides a downward gravitational force. The gear 262 meshes with another gear 264 coupled to a shaft of a motor 268 that is also supported by the second plate 232, for example with the motor 268 being coupled to the second plate 232 via a bracket 270. The motor 268 may also be referred to as an actuator, whereby other types of actuators and connection mechanisms for rotating the sleeve 250 are also contemplated (e.g., linear actuators, worm gears, etc.) A housing 272 encloses the gears 262, 264 and motor 268 for protection against the elements, improved aesthetics, and the like, which may also be coupled to the second plate 232 via brackets. Operation of the motor 268 therefore rotates the sleeve 250, which rotates the sonar system 260 to thereby change a region in which the sensor 202 collected data.

It should be recognized that the sleeve 252 (and thus the sonar system 260), as well as the motor 268 are moveable via movement of the four-bar system 233 at the same time that the shaft 244 is moved, without requiring further coupling to the marine vessel than that of the anchoring system 60. Further, rotation of the sonar system 260 via operation of the motor 268 is independent of the positioning of the sonar system 260 (e.g., depth in the water) via operation of the actuator 234. The motor 268 may be controlled via the multi-functional display 56 (FIG. 1) at the helm 46, via wirelessly connected devices such as smartphones or watches running applications, or other manners discussed further below. This allows the user to change the region in which the data is collected by the sonar system 260 without disturbing the anchoring system 60 in anchoring the marine vessel 1. It should be recognized that the sonar system 260 is positioned vertically higher (e.g., a distance 274) than the end 246 of the shaft 244, as the end 246 is intended to be forced in the ground.

With continued reference to FIG. 2, this embodiment of moveable sensor system 200 is further configured to permit movement of the sensor 202 for collecting data in the vertical direction VER, and independently of moving the shaft 244 anchoring the marine vessel 1. In this embodiment, a rack 276 with teeth is provided on the outside of the sleeve 250. A motor 278 is provided in conjunction with the sonar system 260, for example being protected within the same housing, which is operable to rotate a worm gear 280 that engages the teeth of the rack 276. The motor 278 may be controlled within the control system 900 (FIG. 10) in a similar manner as the motor 268 and the actuator 234 discussed above. In this manner, operating the motor 278 causes the sonar system 260 to move vertically along the sleeve 250, thereby changing a depth of the sensor 202 within the water.

Figure 3:
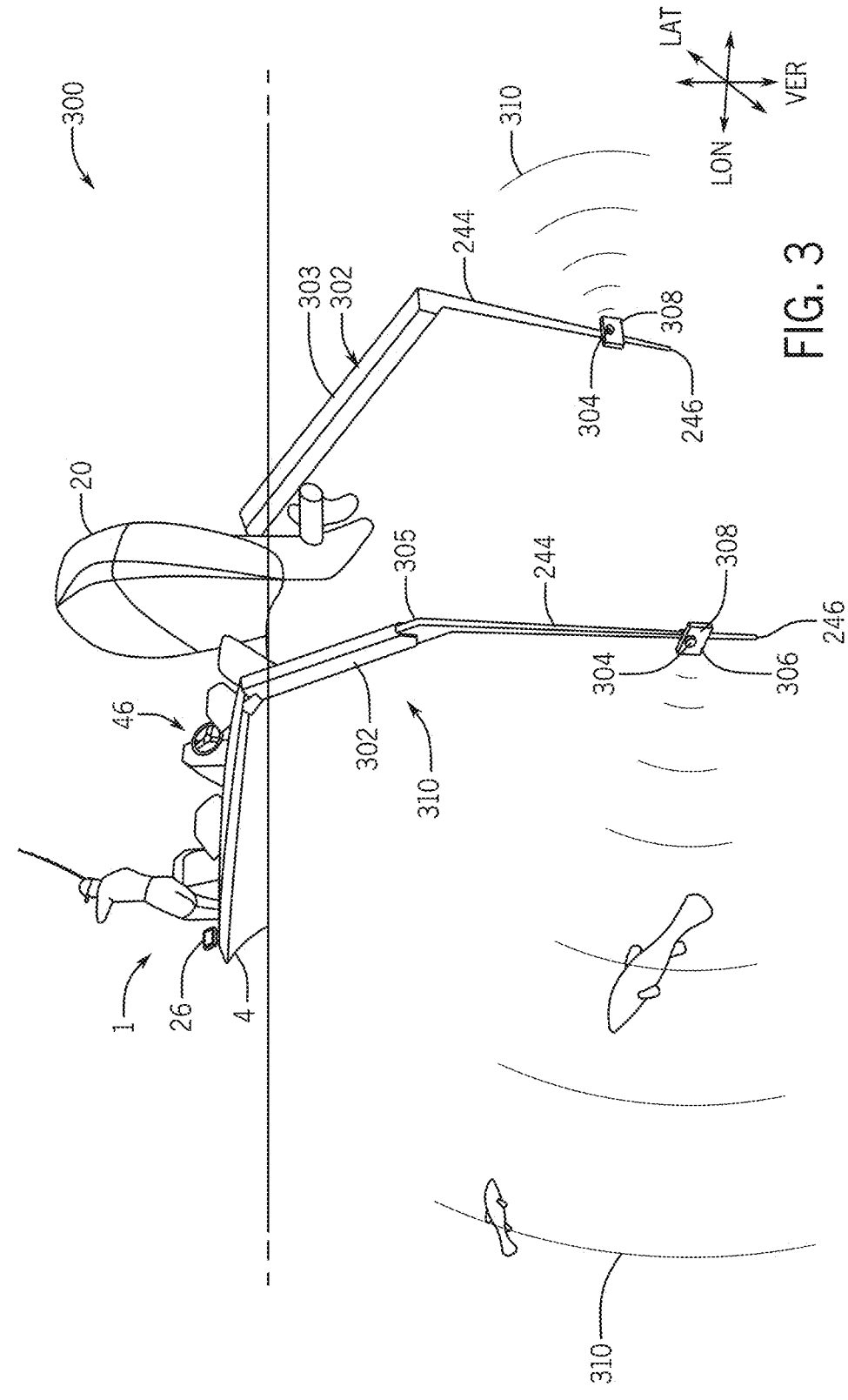
FIG. 3 is a rear isometric view of another marine vessel incorporating moveable sensor systems according to the present disclosure, here in conjunction with anchoring systems.

A further embodiment of moveable sensor system 300 is shown in FIG. 3, which includes some of the elements of the moveable sensor system 200, which for brevity are not repeated. The marine vessel 1 of FIG. 3 has two moveable sensor systems 300, which are each shown with the arms 302 (or a single arm) enclosed within a cover 303. The arms 302 may be the same as the upper arm 218 and the lower arm 224 discussed above. A conductor 305 extends from the sensor 304 to the marine vessel 1 through the shaft 244 and the cover 303 over the arms 302, which provides power, communication, and control for the sonar system 306. A similar configuration may also be provided for other embodiments disclosed herein and is thus not repeated for each embodiment (e.g., see FIG. 4 in which the conductor 305 exits the shaft 412 via an opening near the tiller handle 416, which may be plugged into the marine vessel in a conventional manner).

In this embodiment, each sensor 304 is moveable relative to the housing of the sonar system 306, here being mounted on a gimbal system 308 similar to those used for camera systems in recreational UAV drones. By way of example, DJI of Shenzhen, China makes motorized gimbals for handheld devices (e.g., Osmo Pocket 3, Osmo Action 4), drones (e.g., Mavic 3 Pro, Inspire 3), etc. In such embodiments, the gimbals allow the sensors 304 to pan relative to the shaft 244 to change the region 310 in which data is collected. The gimbals 308 may be controlled independently of each other, and in a similar manner as the motor 268 and the actuator 234 discussed above. It should be recognized that the gimbals 308 further provide that the regions 310 may be changed in the vertical direction VER as well as the lateral direction LAT and longitudinal direction LON. In other words, the sensors 304 may be angled upwardly or downwardly. This may be advantageous for the control system 900 (FIG. 10) to automatically counteract any angle of the shaft 244 relative to the vertical direction VER as the shaft 244 is moved. This may also permit shallower or deeper readings by the sensor 304 without having to vertically translate the sensor 304. The present inventors have recognized that in this case, the control system 900 (FIG. 10) may be configured to automatically adjust the depth in which detect objects are reported to be (e.g., objects at a greater distance are shallower than objects at a near distance when the sensor 304 is angled upwardly, based on the angle in which the sensor 304 is positioned relative to the vertical direction VER.

Figure 4:
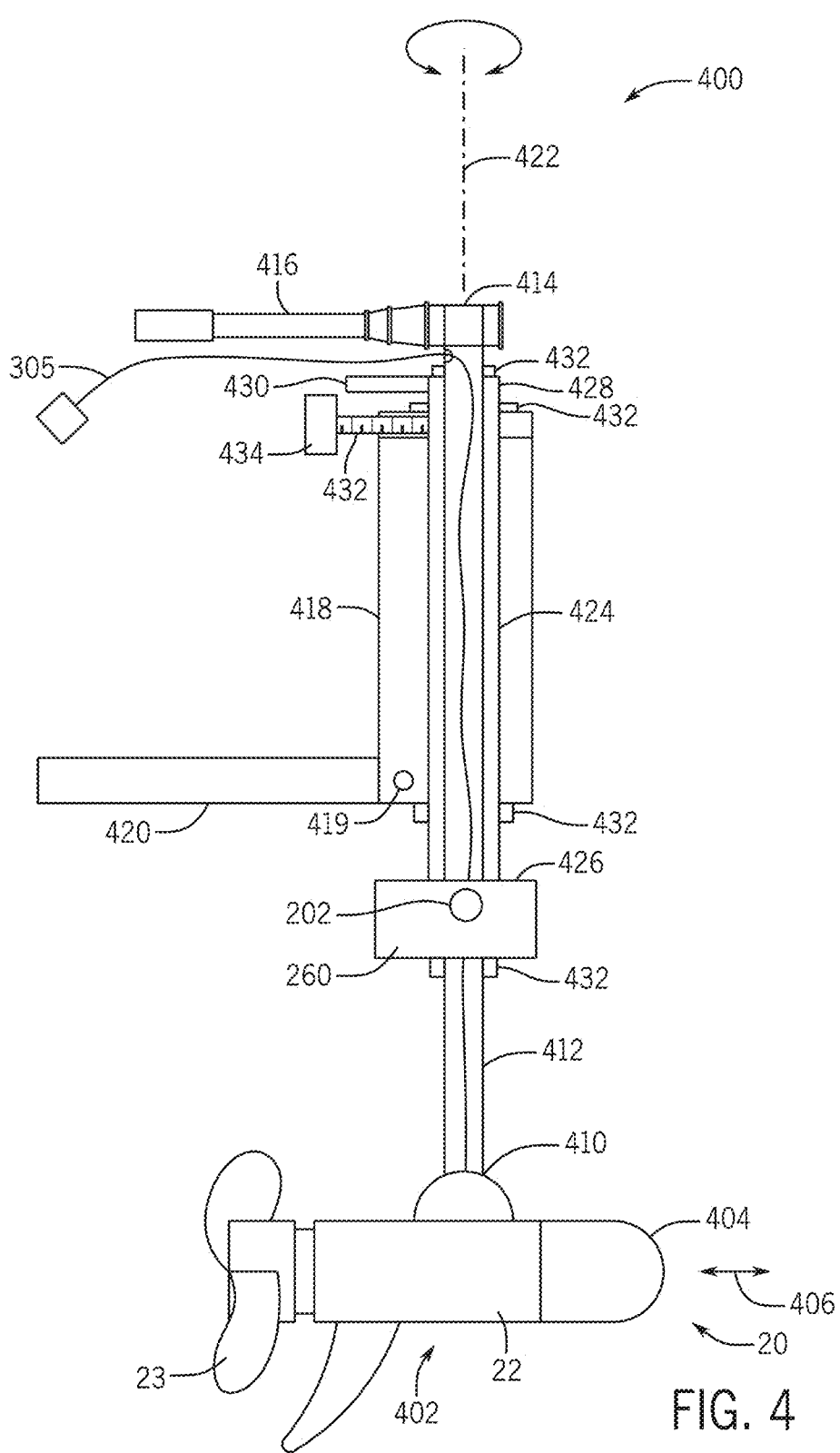
FIG. 4 is a side view of an embodiment of a moveable sensor system provided in conjunction with a marine drive according to the present disclosure.

FIG. 4 depicts another embodiment of a moveable sensor system 400 according to the present disclosure, in this case provided in conjunction with a marine drive 20 such as a trolling motor. The marine drive 20 has a drive housing 402 that protects the powerhead 22 therein, which as discussed above is operable to rotate a propeller 23 opposite a nosecone 404 of the drive housing 402. In this manner, the marine drive 20 generates propulsion in a direction 406 that aligns with the shaft connecting the powerhead 22 to the propeller 23. The drive housing 402 is coupled to a first end 410 of a shaft 412 that extends to a second end 414. The shaft 410 may also be referred to as a support member. A tiller handle 416 is coupled to the second end 414 of the shaft 410. The shaft 410 is rotatably supported by a support tube 418, which may be similar to brackets used for conventionally mounting trolling motors to a deck of a marine vessel or elsewhere. By way of example, the support tube 418 is pivotally coupled via an axle 419 to a base plate 420 through which fasteners may be used to attach the support tube 418 to the marine vessel. The axle 419 permits the marine drive 20 to be pivoted between a stowed position (e.g., out of the water) to a deployed position as shown. The shaft 410 is rotatable about a rotational axis 422 by movement of the tiller handle 416.

Similar to the sleeve 250 of FIG. 2, the moveable sensor system 400 of FIG. 4 includes a sleeve 424 that is rotatably supported by the support tube 418. The sleeve 424 is generally a hollow cylinder extending from a first end 426 to a second end 428 with the shaft 410 extending therethrough. A handle 430 is non-rotatably coupled to the sleeve 424 such that moving the handle 430 rotates the sleeve 424, which rotates about the same rotational axis 422 as the shaft 410, though the shaft 410 and the sleeve 424 are rotationally independent of each other. A set screw 432 with a handle 434 extends radially into the support tube 418 to selectively abut the sleeve 424, thereby rotationally locking the sleeve 424 relative to the support tube 418 and thus relative to the marine vessel to which the support tube 418 is coupled.

With continued reference to FIG. 4, a sonar system is coupled to the first end 426 of the sleeve 424. The sonar system may be the same or similar to the sonar system 260 discussed above with respect to FIG. 2 and is thus not described again in detail here. In this manner, the sensor 202 of the sonar system 260 is moveable about the rotational axis 422, via rotation of the sleeve 424 by the handle 430, to change the region in which data is collected by the sensor 202. This movement of the sensor 202 is independent of the rotational position of the shaft 410, thereby allowing the user to view in one direction while providing propulsion in a different direction.

Collars 432 may be clamped or otherwise coupled to the sleeve 424 and the shaft 410 to prevent axial movement of these elements relative to each other and relative to the support tube 418. The depth of the propeller 23 and the sensor 202 may be adjusted by changing the axial positions of these collars 432. While not shown for clarity, bushings, bearings, and/or the like may be provided between the support tube 418 and the sleeve 424, between the sleeve 424 and the shaft 412, and/or between these elements and the collars 432 to provide smooth rotation.

Two further embodiments of moveable sensors systems are provided in FIGS. 5 and 6 that are again configured to be incorporated with a marine drive having a shaft similar to the marine drive 20 and shaft 412 of FIG. 4, in these configurations with the sensor being moveable via motors rather than manually moveable. It should be recognized that while a given moveable sensor system may be shown in conjunction with one type of other device, such as a marine drive, the present disclosure also contemplates configurations in conjunction with other types of devices, such as anchoring systems. By way of example, the moveable sensor systems 500, 600 may be used with the shafts 244 discussed above, or others.

Figure 5:
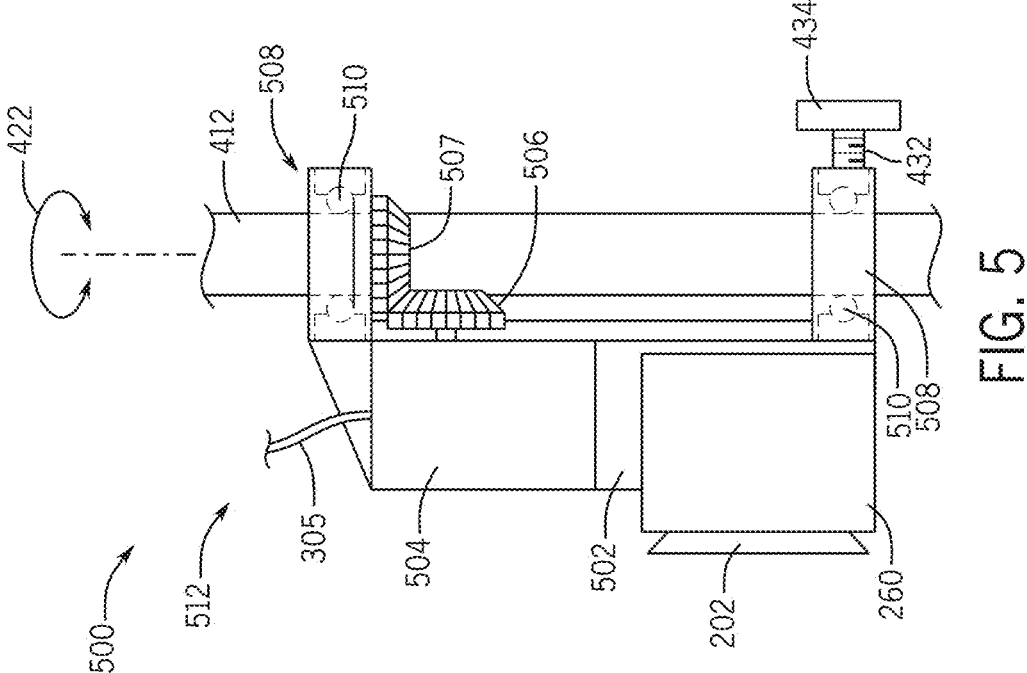
FIG. 5 is a close-up side view of another embodiment of a moveable sensor system according to the present disclosure.

The moveable sensor system 500 of FIG. 5 includes a frame 502 upon which a sensor system (e.g., the sonar system 260 of FIG. 4) and a motor 504 are attached via fasteners, brackets, welds, or other mechanisms known in the art. The motor 504 is operable to rotate a gear 506 in a conventional manner.

Also coupled to the frame 502 is a pair of bearing brackets 508 having bearings 510 therein. The bearing brackets 508 are configured such that the shaft 412 supporting the marine drive extends therethrough with the bearings 510 rotationally supporting the shaft 412 for smooth rotation. In this manner, the frame 502, motor 504, and sonar system 260 (collectively referred to as a moveable assembly 512) are rotatably coupled to the shaft 412 via the bearing brackets 508 to be rotatable about the axis 422 of the shaft 412. A set screw 432 with a handle 434 extends radially into the bearing bracket 508 to selectively abut the shaft 412, thereby rotationally locking the moveably assembly 512 relative to the shaft 412.

The moveable assembly 512 is axially supported by the shaft 412 via a gear 507 non-rotatably coupled to the shaft 412. The gears 506, 507 mesh such that operating the motor 504 rotates the gear 506 causes the moveable assembly 512 to rotate relative to the shaft 412 about the axis 412 (i.e., since the gear 507 is non-rotatable relative to the shaft 412). Similar locking mechanisms or braking mechanisms known in art may assist in preventing rotation of the shaft 412 as the moveable assembly 512 is moving. Since steering locking mechanisms for trolling motors are known, and since this may resemble the set screws disclosed herein, further detail is not provided herein for brevity. Cases in which the shaft 412 is steered via motors or other actuators may already have sufficient braking to prevent the shaft 412 from rotating by virtue of these actuators themselves.

In this manner, the sonar system 260 is moveable to change the region in which data is collected thereby by controlling operation of the motor 504, whereby rotation of the motor in one direction causes rotation of the moveable assembly 512 in one direction, and rotation of the motor in an opposite direction causes rotation of the moveable assembly 512 in an opposite direction. The motor 504 may be controlled in a similar manner to the motor of the marine drive within the control systems disclosed herein and are thus not discussed further for brevity.

Figure 6:
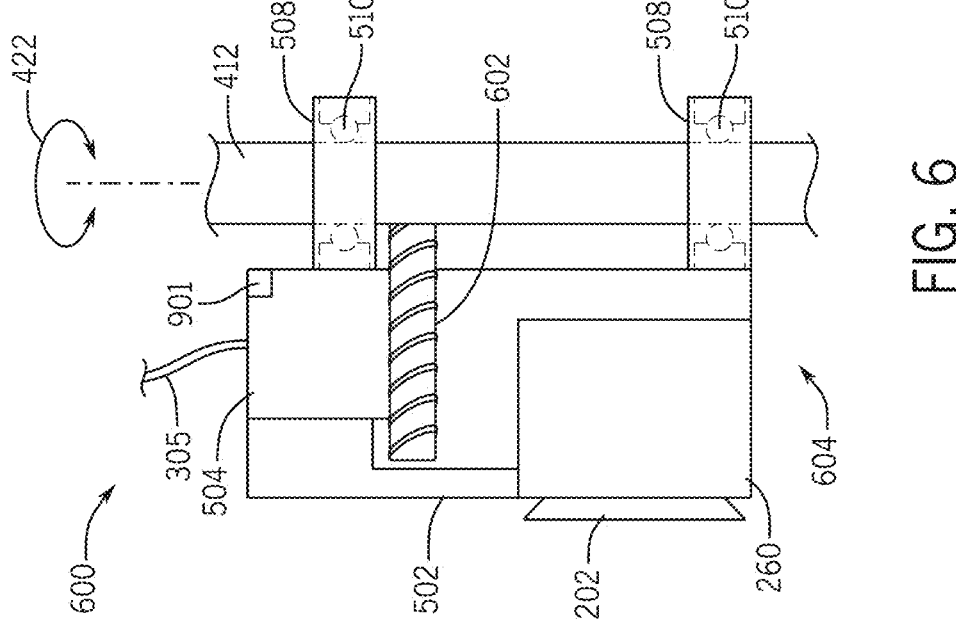
FIG. 6 is a close-up side view of another embodiment of a moveable sensor system according to the present disclosure.

FIG. 6 shows a moveable sensor system 600 similar to the moveable sensor system 500, but with one distinction being that the motor 504 rotates a wheel 602 rather than a gear. The wheel 602 is configured to drive along the outer diameter of the shaft 412 to thereby cause rotation of the moveable assembly 604 (which is similar to the moveable assembly 512) relative to the shaft 412. Other mechanisms are contemplated for interaction between an actuator such as the motor 504 and the shaft 412 to rotate the moveable assembly 604 are also contemplated, such as through the use of worm gears, chains, belts, and/or the like.

Figure 7:
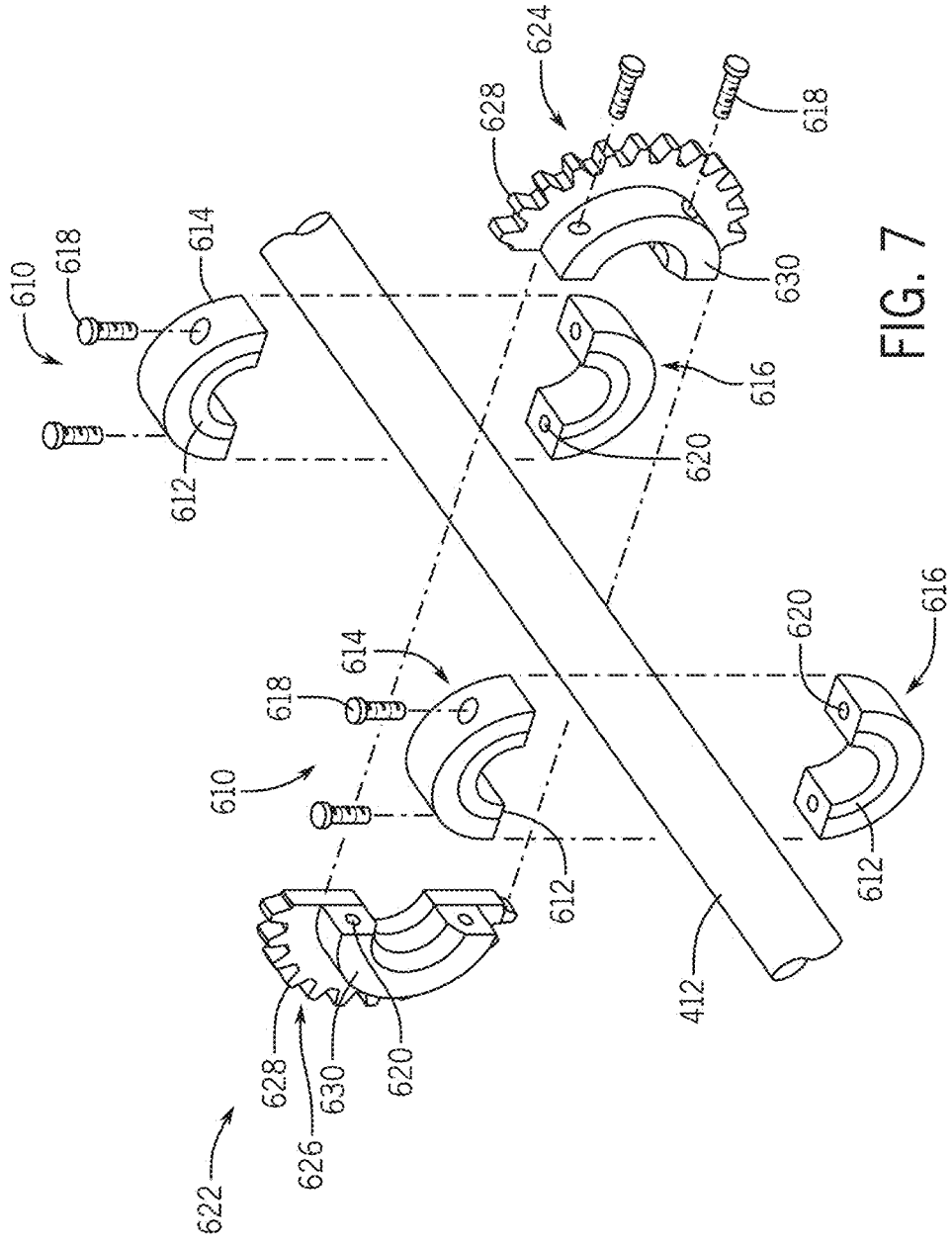
FIG. 7 is a close-up exploded view showing part of another embodiment of a moveable sensor system according to the present disclosure.

The present disclosure contemplates different mechanisms through which the various elements described above may be rotationally or non-rotationally coupled to the shaft 412 (or other support members, such as the shaft 244 of FIG. 3), the sleeve 250 (FIG. 3), or others. This includes the use of welds, rivets or other fasteners (e.g., screws, bolts, etc.), integral formation, and/or other techniques known in the art. This also includes mechanisms that can be advantageously added to an existing shaft 412 to add the functionality of a moveable sensor system according to the present disclosure to an otherwise conventional device such as a marine drive or anchoring system. By way of example, FIG. 7 shows brackets 610 that may be used to couple bearings or bushings 612 to the shaft 412, which in this case include first and second halves 614, 616 that close together around the shaft 412 via fasteners 618 received within threaded openings 620 therein. A gear 622 can also be coupled to the shaft 412 in a similar manner, in this case non-rotatably. The gear 622 is comprises of two halves 624, 626 that each include teeth 628 for meshing with other elements as discussed above, as well as a collar 630 for closing the halves 624, 626 together around the shaft 412 via fasteners 618 received in threaded openings 620. Other types of gears are also contemplated.

Figures 8, 9:
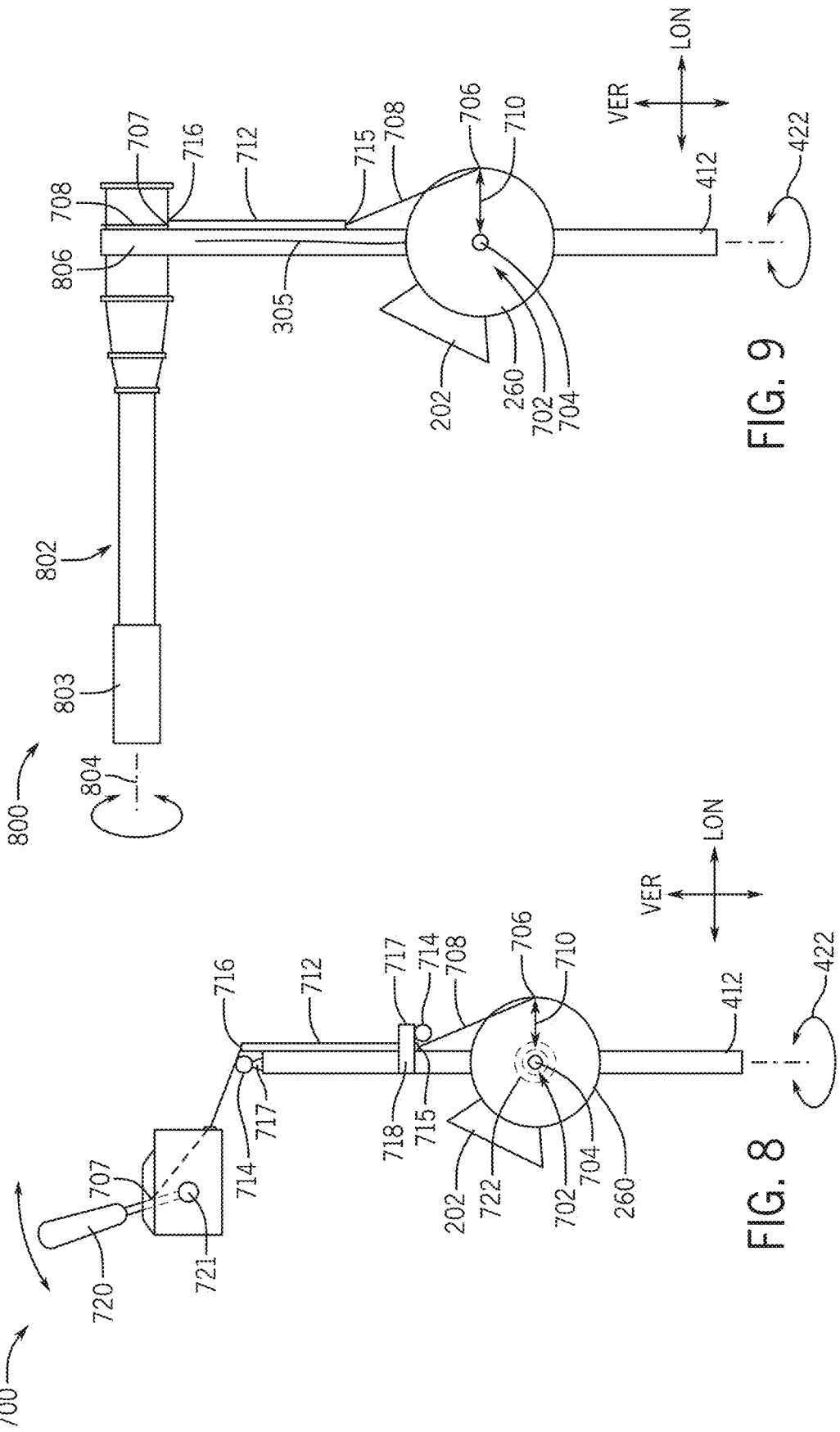
FIG. 8 is a side view of another embodiment of a moveable sensor system according to the present disclosure.
FIG. 9 is a side view of another embodiment of a moveable sensor system according to the present disclosure.

The present disclosure is not limited to moveable sensors systems that rotate about a shaft that is part of another device (e.g., a marine drive or anchor system), not those that translate axially thereon, as discussed above with respect to sensors moveable via gimbals. FIGS. 8 and 9 show two embodiments in which the sonar system 260 may be rotatable about a horizontal axis to pan upwardly or downwardly in the water. For brevity, these systems are discussed in relation to other elements discussed above.

For the moveable sensor system 700 of FIG. 8, an axle 702 is clamped onto the shaft 412 (or others discussed above) using techniques described above or otherwise known in the art. The sonar system 260 is coupled to the axle 702 so as to be pivotable about a horizontal axis 704 extending along the length of the axle 702. For configurations in which the shaft 412 is also rotatable about its own axis, the sonar system 260 will be rotated about the axis 422. The mechanisms through which the shaft 412 may be coupled to the marine vessel are not shown for clarity, but may be similar to those described above or otherwise known in the art.

One end 706 of a cable 708 is coupled to the sonar system 260 at a position radially offset from the horizontal axis 704, here offset by a distance 710 measured perpendicularly to the axis 422 of the shaft 412. The cable 708 extends towards the axis 422 of the shaft 412 and vertically upwardly before passing through a tube 712 that extends in from a first end 715 to a second end 716. The tube 712 protects the cable 708 and also guides the cable 708 to follow vertically allow the outer diameter of the shaft 412. The tube 712 may be integrally formed with the shaft 412 or coupled thereto via straps, clamps, or other mechanisms known in the art. Pulleys 714 may also be incorporated to assist in changing the direction in which the cable 708 extends. Like the tube 712, the pulleys 714 may be coupled to the shaft 412 via a bracket 717 held in place via straps, clamps 718, or other mechanisms known in the art. The cable 708 exits the second end 716 of the tube 712 and is attached at a second end 707 to a lever 720 that rotates about an axis 721 and is configured to be positioned in a location accessible to the user. Similar to a derailer for a bicycle gearset, moving the lever 720 in a first direction pulls on the cable 708 and rotates the sonar system 260 in one direction (pulling the lever 720 left causing counterclockwise rotation), and vice versa. In configurations in which the cable 708 is not rigid enough to push the sonar system 260 (causing clockwise rotation), the sonar system 260 may be coupled to the axle 702 with a spring 722 that biases the sonar system 260 to rotate in a clockwise direction such that as tension on the cable 708 is reduced, the sonar system 260 rotates clockwise (the cable 708 not pushing, but remaining in tension).

The moveable sensor system 800 of FIG. 9 functions similarly to that of FIG. 8, but has a different mechanisms for moving the user to move the sensor system 260. In this case, the shaft 412 is coupled to an arm 802 that extends along an axis 804 that is generally perpendicular to the axis 422 of the shaft 412. The arm 802 with a handle grip 803 is moveable to rotate the shaft 412 about the axis 422 in a similar manner to which a conventional marine drive may be manually steered. The arm 802 is also coupled such that it is rotatable relative to the shaft 412 about the axis 804. For example, a bracket 806 with bushings may couple the arm 802 to the top of the shaft 412 such that the arm 802 is rotatable therein. The second end 707 of the cable 708 is coupled to the outer diameter of the arm 802 such that rotating the arm 802 wraps and unwraps the cable 708 around the arm 802. In this manner, rotating the arm 802 about the axis 804 either pulls or pushes on the cable 708 in a similar manner to moving the lever 720 or FIG. 8, or maintains tension and selectively allows the sensor system 260 to rotate under the bias of an internal spring (for example), as discussed above. This configuration advantageously permits the sensor system 260 to be adjustable without adding a further handle. In other words, the same arm 802 advantageously permits both steering and moving of the sensor system 260.

Figure 10:
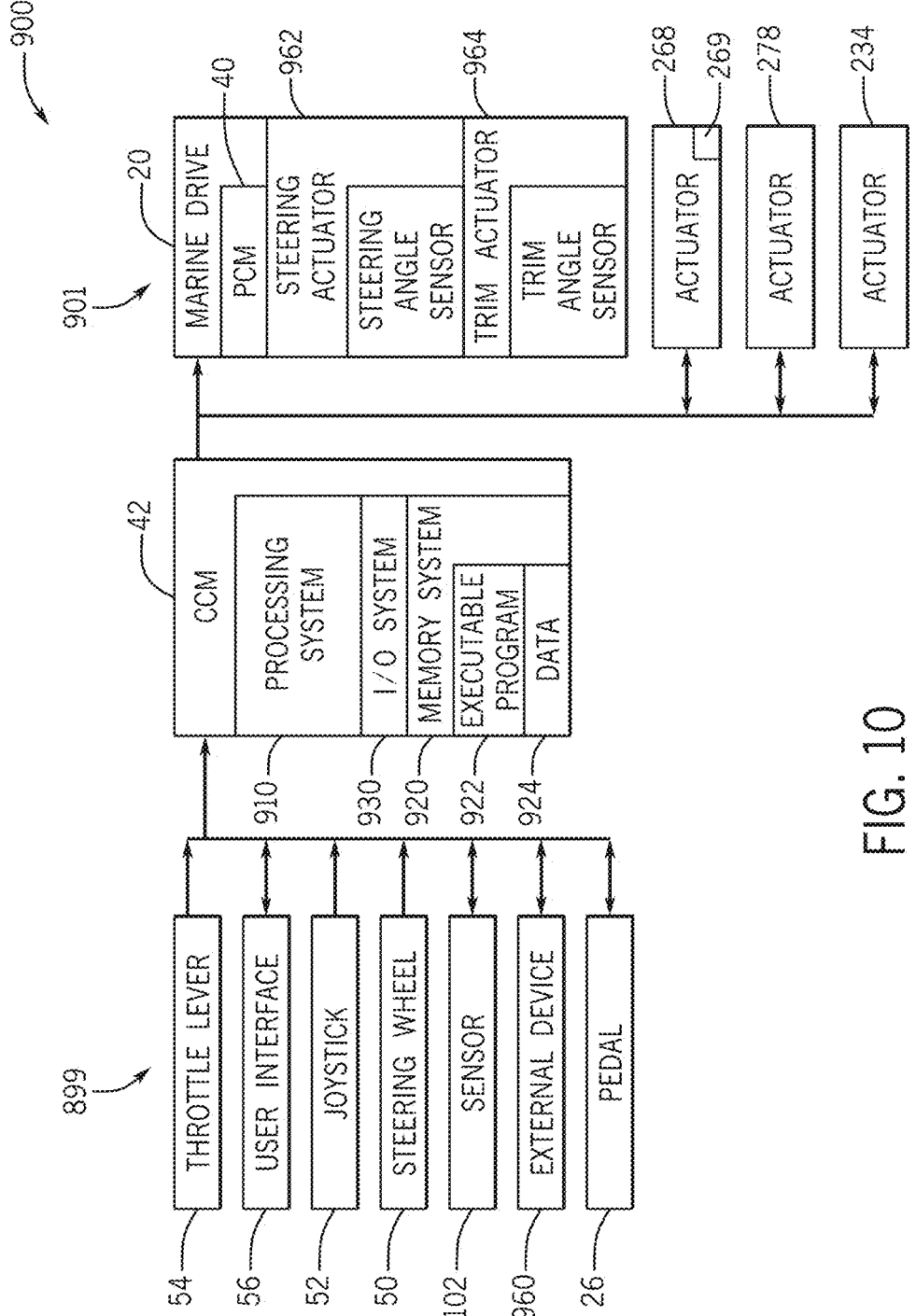
FIG. 10 is a schematic view of a control system for operating a moveable sensor system according to the present disclosure.

With reference to FIGS. 1 and 10, additional information is now provided for an exemplary control system 900 for operating moveable sensor systems for marine vessels according to the present disclosure. It should be noted that the control system 900 does not expressly label all disclosed embodiments of a particular element, but provides one example (e.g., the motor 268 as one example of an actuator). The control system 900 also operates other systems within the marine vessel 1, as will become apparent. The control system 900 includes the CCM 42, the PCM 40, and the HCM 44 discussed above. A person of ordinary skill in the art will recognize that these subsystems may also be present within additional CCMs 42 (as applicable) and/or PCMs 40 or other controllers (e.g., a controller 901 specific to the moveable sensor system, see FIG. 6) within the marine vessel 1. It should be recognized that while the present description generally refers to a configuration in which the control of the moveable sensor system is centralized (e.g., handled by the CCM 42), local controllers 901 within the moveable sensor system may receive inputs and provide outputs to effectuate the necessary operations for movement independently from the marine vessel, which may be advantageous for systems added to existing marine vessels.

In the example shown in FIGS. 1 and 10, each CCM 42 includes a processing system 910, which may be implemented as a single microprocessor or other circuitry or be distributed across multiple processing devices or sub-systems that cooperate to execute the executable program 922 from a memory system 220. Non-limiting examples of the processing system include general purpose central processing units, application specific processors, and logic devices.

The memory system 920 may comprise any storage media readable by the processing system 910 and capable of storing the executable program 922 and/or data 924. The memory system 920 may be implemented as a single storage device or be distributed across multiple storage devices or sub-systems that cooperate to store computer readable instructions, data structures, program modules, or other data.

The memory system 920 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 930 provides communication between the control system 900 and peripheral devices, such as input devices 899 and output devices 901, which are discussed further below. In practice, the processing system 910 loads and executes an executable program 922 from the memory system 920, accesses data 924 stored within the memory system 920, and directs the different systems of the marine vessel (including the moveable sensor systems) to operate as described herein.

A person of ordinary skill in the art will recognize that these subsystems within the control system 900 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories.

Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices.

The control system 900 communicates with each of the one or more components of the marine vessel 1 via a communication link CL, which can be any wired or wireless link. The illustrated communication link CL connections between functional and logical block components are merely exemplary, which may be direct or indirect, and may follow alternate pathways. The control system 900 is configured to receive information and/or to control one or more operational characteristics of the marine vessel 1 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine vessel 1. Moreover, the communication link CL lines are meant only to demonstrate that the various control elements are configured for communicating with one another, and do not represent actual wiring connections between the various elements, nor do they represent the only paths of communication between the elements. Additionally, the marine vessel 1 may incorporate various types of communication devices and systems, and thus the illustrated communication links CL may in fact represent various types of wireless and/or wired data communication systems.

As discussed above, the control system 900 communicates with input devices 899 from various components such as user input devices, for example via sensors that detect the positions of the throttle lever 54, the steering wheel 50, and/or a joystick 52, respectively. The control system 900 also communicates with other input devices, such as the multi-functional display device 56, a GPS 57, and an IMU/AHRS 58. The sensor of the movable sensor system (e.g., sensor 102) is also an input device 899 (as well as an output device 901).

Another input device 899 to the control system 900 is the pedal 26 of FIG. 1. The pedal 26 includes conventional functions for controlling a marine drive 20, such as throttle pedals 950 (forward and backward) that receive inputs for forward or backward propulsion and the magnitude thereof, as well as steering pedals 952 (port and starboard) for changing a direction in which this propulsion is generated (i.e., for steering). The pedal 26 further includes additional components for operating the moveable sensor system 100 as described above. Specifically, the pedal 26 includes turning pedals 954 (clockwise and counterclockwise) for receiving user inputs to move the sensor 102 to thereby change the region 104 in which data is being collected, here clockwise or counterclockwise. It should be recognized that the pedal 26 may additionally or alternatively include pedals for changing the depth of the sensor 102 in the water and/or to angle the sensor upwardly or downwardly in the water depending on the capabilities of the particular moveable sensor system. As discussed further below, these turning pedals 954 are received within the control system 900, which then controls the corresponding actuators (e.g., motor 268 of FIG. 2) to effectuate this movement. Other input devices 899 and mechanisms for providing inputs to the control system 900 are also contemplated, such as a wireless device 960 like a smart phone operating software providing functionality akin to the pedal 26. Communication with a wireless device 960 may be performed in a manner known in the art and is thus not discussed herein for brevity.

The control system 900 also communicates with output devices 901 such as the actuators within the moveable sensors systems used to change the region in which data is collected from sensors thereof (e.g., the motor 268 of FIG. 2). Additional output devices 901 include the multi-functional display device 62 and other devices as the helm 46, the PCM 40, steering actuators, and trim actuators, for example. The sensor within the moveable sensor system (e.g., sensor 102) also serves as an output device 901 in the at the control system 900 controls operation thereof in addition to receiving the data therefrom as an input device 899. This data may then be displayed on the multi-functional display device 62, and wireless device, or other conventional uses. It will be recognized that the arrows shown are merely exemplary and that communication may flow in multiple directions (e.g., the sensor 102 being an input device 899 and an output device 901).

With continued reference to FIGS. 1 and 10, the pedal 26 is also an output device 26, which includes two display devices 970, 972 such as LED screens (it should be recognized that the present disclosure also contemplates these being combined). The first display device 970 shows the conventional output generated by the data collected by the sensor (e.g., sensor 102), such as graphics of fish at various positions on the screen that correspond to the location of the fish. The second display device 972 advantageously displays for the user the region in which the sensor is collecting data, since unlike systems known in the art this cannot necessarily be discerned from viewing the marine drive itself. In this example the second display device 972 displays a polar coordinate system with a graphic 974 indicating the relative position of the region in which the data is being collected. The polar coordinate system is aligned with the marine vessel such that the graphic 974 being at the 12:00 position indicates the region being dead ahead, the 6:00 position indicates the region being aftwardly, etc. The control system 900 may determine the orientation of the region in which data is being collected based on data provided by the actuators that position the sensor (e.g., an encoder 269 for the motor 268 of FIG. 2). In other examples a sensor may be positioned to determine the rotational position of the sensor relative to the shaft or support member for which the sensor is relatively moveable.

Figure 11:
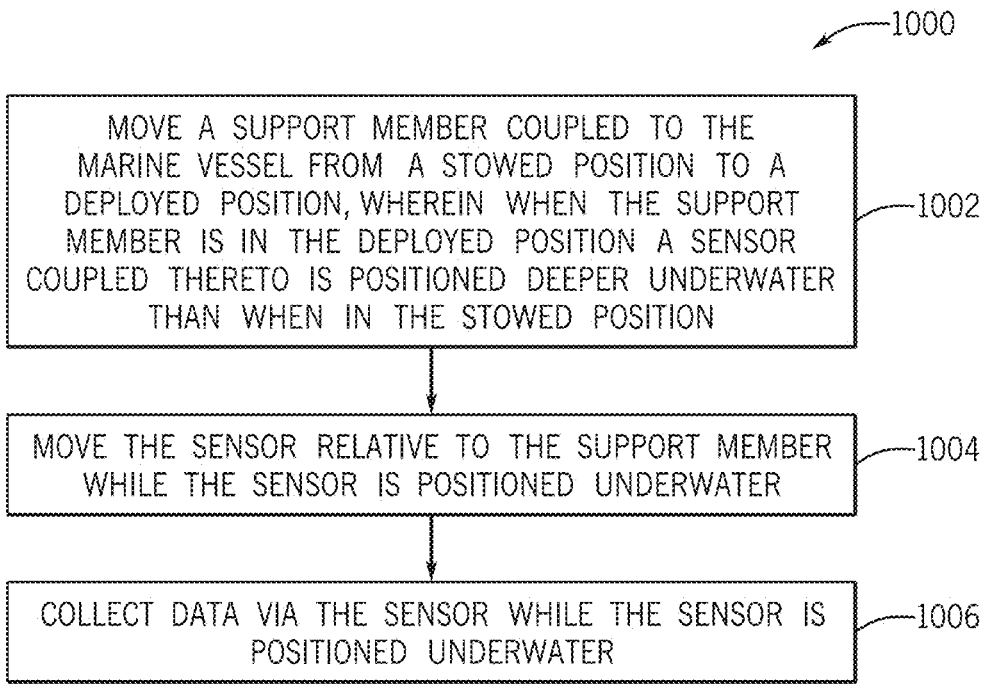
FIG. 11 is a flow chart depicting one method for collecting data underwater for a marine vessel according to the present disclosure.

FIG. 11 shows one method 1000 for collecting data underwater for a marine vessel according to the present disclosure, which may be performed using the components described above. Step 1002 provides for moving a support member coupled to the marine vessel from a stowed position to a deployed position, wherein when the support member is in the deployed position a sensor coupled thereto is positioned deeper underwater than when in the stowed position. By way of example, this may include moving a shaft of an anchoring system from a stowed position that is out of, or shallow in, the water to a deployed position in which the shaft is forced into the ground to anchor the marine vessel. Step 1004 provides for moving the sensor relative to the support member while the sensor is positioned underwater. As discussed above, this may be performed in a number of different ways, such as using a variety of different actuators controlled manually, with motors, etc. Moreover, the movement of the sensor may be rotation about the support member, vertical translation relative to the support member, and/or tilting. Step 1006 provides for collecting data via the sensor while the sensor is positioned underwater.

The present inventors have further recognized that the systems and methods disclosed herein have further benefits than those expressly described. For example, even where a marine vessel is being used in water that is deeper than a shallow water anchoring system could be used for anchoring, this shallow water anchoring system may still nonetheless be useful as a mechanism for deploying other devices such as sonar systems. Likewise, in such instances in which shallow water anchoring is not possible or not desired, the present inventors have recognized that trolling motors and other devices may be used to digitally anchor the vessel (e.g., Mercury Marine's Skyhook®). In this case, it is advantageous to also be able to use a sonar system (or others) in conjunction with these digital anchoring devices, which already have reason for being deployed.

In this manner, the presently disclosure provides for different systems and methods of collecting data underwater for a marine vessel, without the limitations described above.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A moveable sensor system for a marine vessel, the moveable sensor system comprising:

a support member configured to be coupled to the marine vessel, wherein the support member is configured to at least one of support a marine drive for propelling the marine vessel and to anchor the marine vessel;

a sensor moveably coupled to the support system so as to be positioned for collecting data within a region underwater; and an actuator coupled between the support member and the sensor, wherein the actuator is operable to move the sensor relative to the support member to thereby change the region in which the data is collected.

2. The moveable sensor system according to claim 1, wherein the support member is configured to be moveable relative to the marine vessel to selectively anchor the marine vessel therewith.

3. The moveable sensor system according to claim 1, wherein the support member extends along an axis, and wherein the actuator is operable to move the sensor about the axis.

4. The moveable sensor system according to claim 1, wherein the region comprises a depth underwater, and wherein the actuator is operable to move the sensor to change the depth in which the data is collected by the sensor.

5. The moveable sensor system according to claim 1, wherein the actuator comprises an electric motor operable to move the sensor.

6. The moveable sensor system according to claim 5, wherein the support member extends along an axis, and wherein the electric motor comprises a motor shaft that is rotated during operation, the motor shaft extending along a motor shaft axis that is parallel to axis of the support member.

7. The moveable sensor system according to claim 5, wherein a conductor for providing power to the electric motor extends through at least a portion of the support member so as to be protected therein.

8. The moveable sensor system according to claim 5, further comprising a controller configured to control the electric motor in response to a user input.

9. The moveable sensor system according to claim 1, wherein the sensor comprises a sonar sensor.

10. The moveable sensor system according to claim 1, wherein the marine vessel further comprises a marine drive coupled to the support member and operable to generate propulsion for the marine vessel.

11. The moveable sensor system according to claim 10, wherein the actuator moves the sensor relative to the marine drive.

12. The moveable sensor system according to claim 11, wherein the marine drive is steerable independently of the actuator moving the sensor.

13. The moveable sensor system according to claim 1, further comprising links through which the support member is coupled to the marine vessel as a four-bar linkage.

14. The moveable sensor system according to claim 1, wherein the support member is moveable relative to the marine vessel between a at least one deployed position in which the sensor is positioned underwater and a stowed position in which the sensor is out of the water.

15. The moveable sensor system according to claim 1, wherein the actuator comprises a cable through which tension is adjustable to move the sensor relative to the support member.

16. The moveable sensor system according to claim 1, wherein the support member is a first support member, the sensor is a first sensor configured to collect the data from a first region, and the actuator is a first actuator, further comprising:

a second support member configured to be coupled to the marine vessel, a second sensor moveably coupled to the support system so as to be positioned for collecting data within a second region underwater; and a second actuator coupled between the second support member and the second sensor, wherein the second actuator is operable to move the second sensor relative to the second support member to thereby change the second region in which the data is collected, wherein the second region is different than the first region.

17. The moveable sensor system according to claim 16, wherein the first actuator and the second actuator comprise electric motors operable to move the first sensor and the second sensor, respectively.

18. The moveable sensor system according to claim 17, further comprising a controller configured to control the electric motors together in response to a user input.

19. A method for collecting data underwater for a marine vessel, the method comprising:

moving a support member coupled to the marine vessel from a stowed position to a deployed position, wherein when the support member is in the deployed position a sensor coupled thereto is positioned deeper underwater than when in the stowed position;

moving the sensor relative to the support member while the sensor is positioned underwater; and collecting data via the sensor while the sensor is positioned underwater.

20. The method according to claim 19, further comprising moving the sensor relative to the support member by controlling an electric motor coupled therebetween.

\* \* \* \* \*